United States Patent [19]

Hayashi

[11] Patent Number: 5,431,485
[45] Date of Patent: Jul. 11, 1995

[54] CENTER LOCK DEVICE FOR AUTOMOBILE WHEELS

[76] Inventor: Masakazu Hayashi, 5-21, 1-Chome, Takaidanishi, Higashi-Osaka-Shi, Osaka-Fu, Japan

[21] Appl. No.: 180,339

[22] Filed: Jan. 12, 1994

[30] Foreign Application Priority Data

Jun. 22, 1993 [JP] Japan ................................ 5-038863 U

[51] Int. Cl.⁶ ............................................ B60B 27/06
[52] U.S. Cl. ................................. 301/35.55; 301/9.1; 301/35.63; 301/105.1
[58] Field of Search ................... 301/9.1, 35.53, 35.54, 301/35.55, 35.56, 35.57, 35.58, 35.61, 35.62, 35.63, 105.1

[56] References Cited

U.S. PATENT DOCUMENTS

| | | |
|---|---|---|
| 2,232,859 | 2/1941 | Limprecht . |
| 4,478,458 | 10/1984 | Flexman . |
| 4,537,449 | 8/1985 | Hayashi . |
| 5,211,448 | 5/1993 | Hayashi . |

FOREIGN PATENT DOCUMENTS

| | | |
|---|---|---|
| 450794 | 8/1948 | Canada . |
| 1504385 | 12/1966 | France . |
| 46-18642 | 5/1971 | Japan . |
| 53-38701 | 4/1978 | Japan . |
| 59-118502 | 7/1984 | Japan . |
| 59-190001 | 10/1984 | Japan . |
| 1-16641 | 5/1989 | Japan . |
| 413884 | 7/1934 | United Kingdom . |

*Primary Examiner*—Russell D. Stormer
*Attorney, Agent, or Firm*—Armstrong, Westerman, Hattori, McLeland & Naughton

[57] ABSTRACT

The invention is intended to improve the durability and stability of the attaching state in automobile wheels. For fixing a wheel disk to the hub of an axle through a top hat type or cylinder hat type adapter, the relatively thin center shaft portion projecting forwardly from the conical barrel of the adapter is cut to form a male thread for engagement with a center nut and a female thread for engagement with a keep bolt for its nut, while an insert leg annular portion projecting rearwardly from a keep collar adapted to be inserted on the center shaft portion and a support annular portion correspondingly projecting forwardly from the shoulder region of the conical barrel are fitted together, thereby preventing a neck break accident to the center shaft portion.

2 Claims, 11 Drawing Sheets

CENTER LOCK DEVICE FOR AUTOMOBILE WHEELS

BACKGROUND OF THE INVENTION

The present inventor has previously proposed U.S. Pat. No. 5,211,448 as a center lock device for preventing the stealing of automobile wheels while increasing the efficiency of automobile wheel mounting and dismounting exchange operation and while eliminating the uneasiness about the mounted state of wheels.

In the embodiments shown in FIGS. 1 through 9 of this known invention, a male thread 21 or 21a is cut in a relatively thin solid center shaft portion 20 or 20a extending from the center of an adapter A and a collar C for locking a wheel disk D is slid on said shaft portion 20 or 20a, whereupon a small-sized center lock nut N is threadedly engaged with said male thread 21 or 21a and tightened to press against the collar C from the front. The center shaft portion 20 or 20a is centrally formed with a female thread 22 or 22a which differs from said male thread 21 or 21a in the spiral pitch P1 or P2 and in the direction of spiral and a cap bolt B is screwed into said female thread 22 or 22a from the front, said cap bolt having a head 33 or 33a of large diameter which restrains said center lock nut N from slipping off.

According to the arrangement of such known invention, relatively commonplace small-sized parts can be employed as the center lock nut N and the cap bolt B for preventing said nut from slipping off, and the employment of such small-sized parts visually limits less the front surface of the wheel disk D, leaving an ample area thereon to form various ventilation patterns for heat dissipation on the wheel disk D and allowing the spokes serving as supports for the wheel rims to look as great in length as possible.

However, the center shaft portion 20 or 20a extending forwardly from the center of a conical barrel 19 or forming a top hat type or cylinder hat type adapter A is itself relatively thin, with the result that rotational bending stress produced during use with the wheel mounted repetitively concentratedly acts on said center shaft portion; thus, there is not without the danger of the center shaft portion 20 or 20a breaking off at its proximal end, or the so-called neck break accident, leading problems of decreased durability and decreased safety of the wheel attached state. Even if that is the case, however, thickening the center shaft 20 or 20a would reduce the aforesaid advantages.

Further, the above-mentioned known invention has paid no special attention to adjustment of the wheel offset (the clearance between the wheel disk attaching surface relative to the axle hub and the equator line of the wheel rim).

Therefore, in the case of the arrangement of the known invention, in adjusting the offset according to the type of the automobile, there is no other way to do this than preparing in advance various types of wheels which differ in offset or preparing in advance various types of adapters A whose joint flange 23 or 23a differs in thickness and selectively using them. However, this approach is still disadvantageous in that it is expensive and in that the efficiency of exchange operation is low.

SUMMARY OF THE INVENTION

The present invention has solved such problems while retaining the merits of the known invention described above.

More particularly, a first object of the invention is to provide a center lock device for fixing an automobile wheel on the hub of an axle by using a separate adapter and a single center lock nut to be threadedly engaged with the male thread of a center shaft portion integrally extending forwardly from the center of said adapter, characterized by comprising an insert leg annular portion integrally extending rearwardly from a keep collar adapted to be locked to the boss of a wheel, a support annular portion associated with said insert leg annular portion of said keep collar and integrally extending forwardly from the shoulder region of the conical barrel of the adapter, said insert leg annular portion of said keep collar being supported in stabilized fit relation by said support annular portion of said adapter, whereby the rotational bending stress repetitively concentratedly acting on the proximal end of said center shaft portion of the adapter, which center shaft portion is formed relatively thin, is effectively distributed by said support annular portion, protecting the center shaft portion from the neck break accident, thus obtaining a wheel attached state which is durable and stabilized.

A second object of the invention is to provide an arrangement wherein various offset adjusting shims which differ in sheet thickness alone or in both sheet thickness and the opening diameter of axle receiving centering hole are removably and interchangeably clamped in lining accessory relation to a joint flange of the adapter so as to attach the adapter to the hub of the axle through such shim; thus, the offset which differs with automobile makers or automobile types can be easily adjusted simply by exchanging said shim, thereby enhancing interchangeability and productivity.

Other objects will become apparent from the following detailed description of preferred embodiments.

BRIEF DESCRIPTION OF THE DRAWINGS

FIG. 1 through 11 show a basic embodiment of the invention;

DETAILED DESCRIPTION OF THE PREFERRED EMBODIMENTS

The concrete arrangement of the present invention will now be described in detail with reference to the accompanying drawings. In FIGS. 1 through 11 showing a basic embodiment of the invention, the character D denotes a wheel disk of light alloy metal, having at the center of its boss 10 a relatively large shaft hole 11. The numerals 12 and 13 denote a plurality of torque pin receiving female threads and a plurality of hub nut clearing recesses, respectively, which are formed on the rear surface of the boss 10 (the attaching surface of the wheel disk) and positioned around the shaft hole 11, and in each case, they are radially symmetrically distributed as a whole, and these two types of holes 12 and 13 alternate with each other.

The numeral 14 denotes torque pins threadedly engaged with said female threads 12 of said wheel disk in a stud bolt fashion, rearwardly projecting a fixed distance from the rear surface of the boss 10. The numeral 15 denotes a turning tool engaging notches formed in the rear ends of the torque pins, each torque pin 14 being threadedly engaged with said female thread 12 by a turning tool (not shown) applied thereto.

The numeral 16 denotes a stopper flange projecting with a somewhat large diameter from an intermediate portion of each torque pin, adapted to engage a recessed surface 17 notched in the opening edge of said female thread 12, thereby controlling the amount by which the torque pin projects when it is set and preventing the play of the torque pin 14 itself.

The character A denotes a separate adapter for attaching the boss 10 of said wheel disk D to an axle hub 18, said adapter being made of iron or light alloy and shaped by forging, pressing or other plastic working into a top hat form or cylinder hat form.

Figure 5:
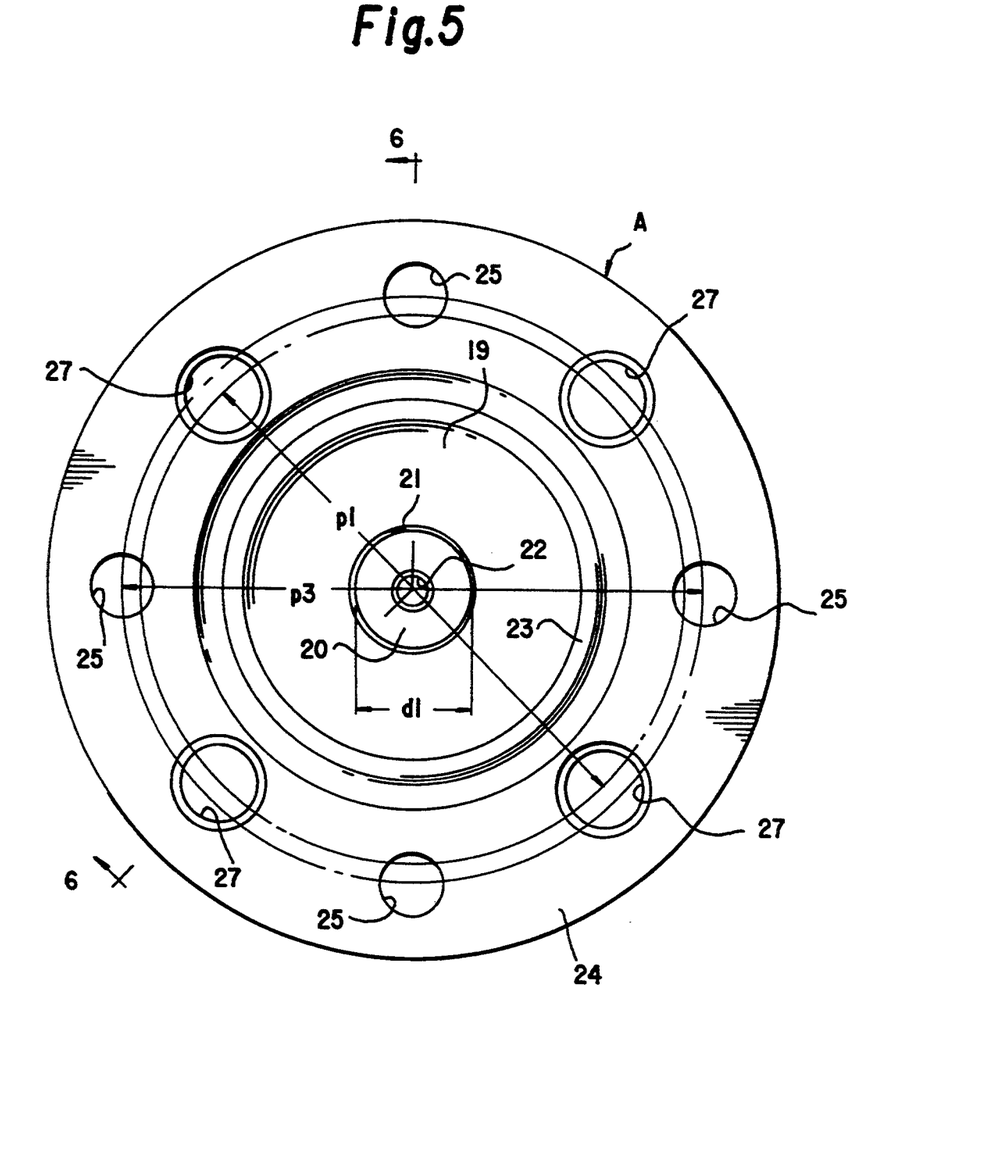
FIG. 5 is a front view of an adapter.
Figure 6:
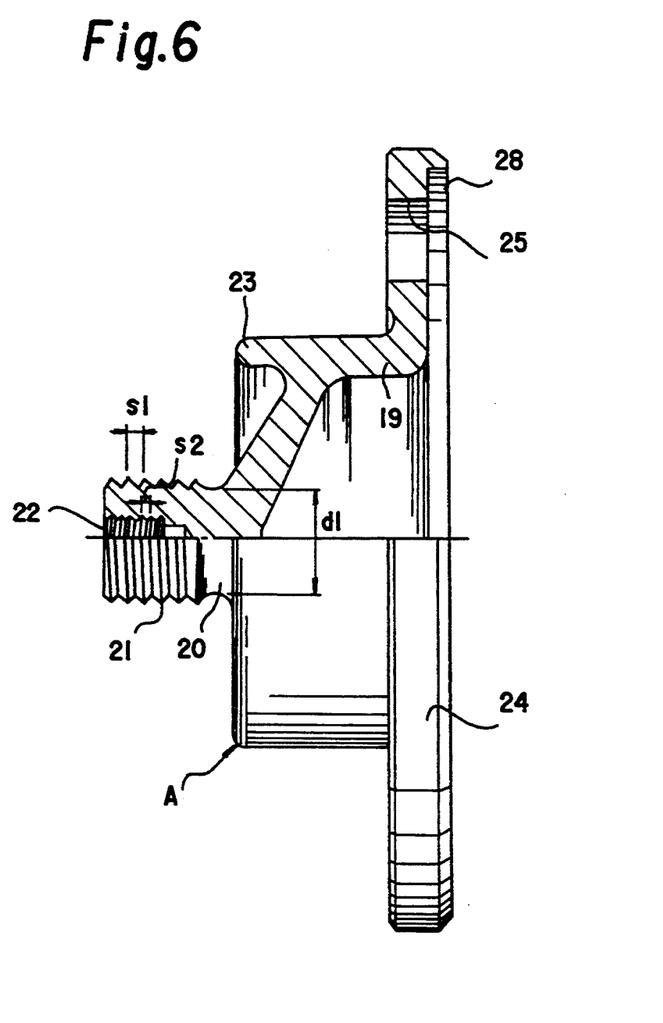
FIG. 6 is a half-sectional view taken along the line 6—6 in FIG. 5.

That is, in FIGS. 5 and 6 showing it detached, the numeral 19 denotes the substantially conical barrel of the adapter A, having a size allowing it to sink in the shaft hole 11 of the wheel disk D. The numeral 20 denotes a solid center shaft portion integrally projecting forwardly from the center (top surface) of the barrel 10 and having a diameter d1 (actually, about 20 mm, for example) smaller than that of the barrel 19 and formed at the circumferential surface thereof with a male thread 21 for receiving a center nut to be later described and at the center thereof with a female thread 22 of fixed depth for receiving a keep bolt to be later described, In that case, the male thread 21 and the female thread 22 of the center shaft portion 20 have their spiral pitches s1 and s2 and spiral directions respectively made different, so that in the state of use where a center nut to be later described is held by the keep bolt, it is locked so that it cannot be easily concomitantly turned for loosening.

In this point, in the illustrated embodiment, the spiral direction of said male thread 21 is clockwise and its spiral pitch s1 is relatively long, while the spiral direction of the female thread 22 is counterclockwise and its spiral pitch s2 is relatively short. However, so long as said purpose can be achieved, the relations between the female and male threads 22 and 21 may be made opposite as to the spiral pitches s1 and s2 and the spiral directions.

Further, the numeral 23 denotes a keep collar support annular portion integrally extending forwardly from the shoulder region of the conical barrel 19 of said adapter A, said keep collar support annular portion being adapted to fit on the insert leg annular portion of a keep collar to be later described to support said leg annular portion, whereby the rotational bending stress concentratedly acting on said center shaft portion 20 is effectively distributed, thus protecting the center shaft portion from the neck break accident and increasing the durability and safety of the wheel attached state.

The support annular portion 23 extends substantially parallel with said center shaft portion 20, its extension being shorter than the length of the center shaft portion 20, and it sinks in the shaft hole 11 of the wheel disk D.

Further, the numeral 24 denotes a large-diametered joint flange integrally extending from the proximal end of the conical barrel 19, said joint flange being formed with a plurality of torque pin receiving holes 25 in a radially symmetrically distributed pattern corresponding to the torque pins 14 projecting from the boss 10 of the wheel disk D.

The numeral 25 denotes a plurality of stud bolts integrally extending forwardly from the hub 18 of said axle, and stud bolt receiving holes 27 for receiving them are distributively formed in the joint flange 24 of the adapter A to alternate with the torque pin receiving holes 25.

Figure 3:
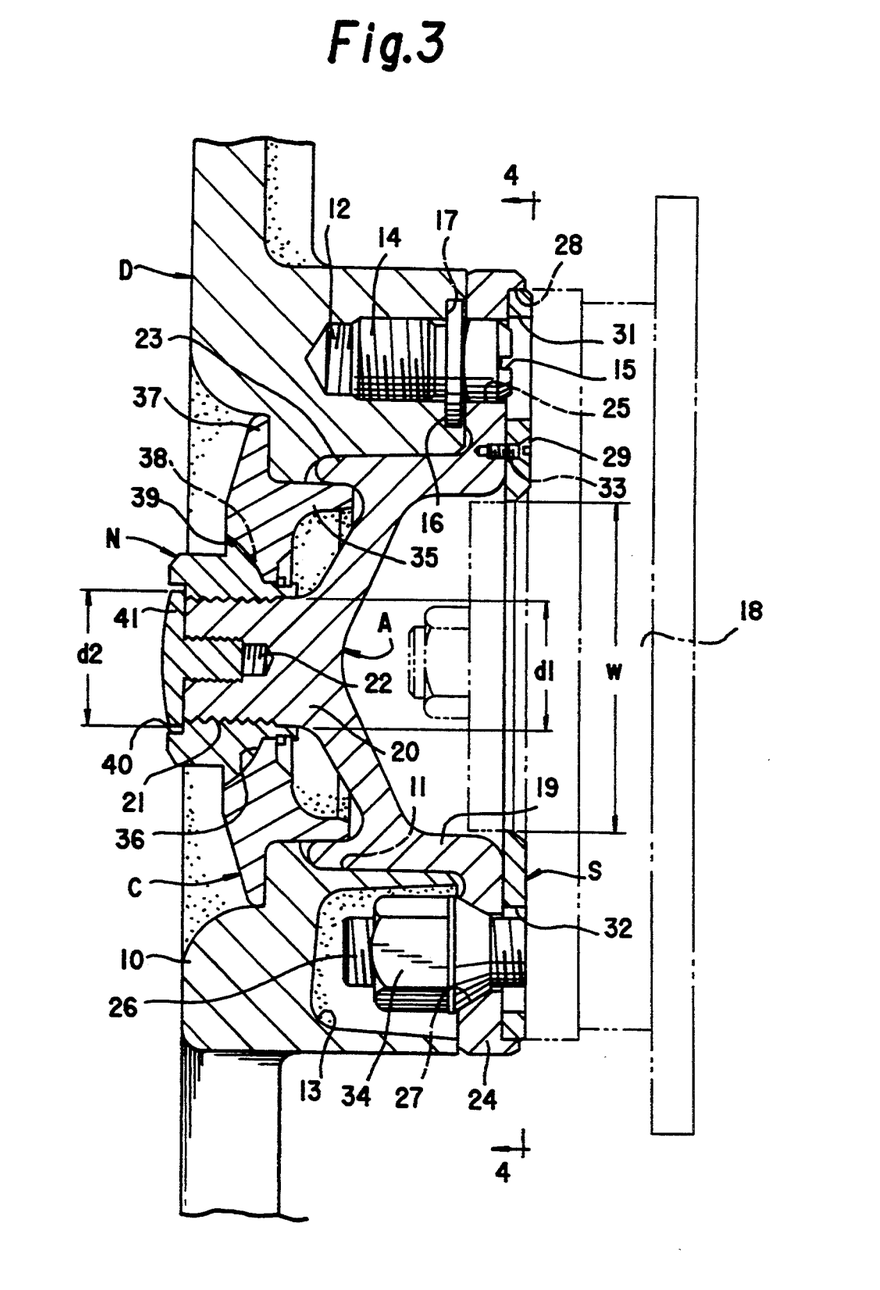
FIG. 3 is a sectional view taken along the line 3—3 in FIG. 2.
Figure 4:
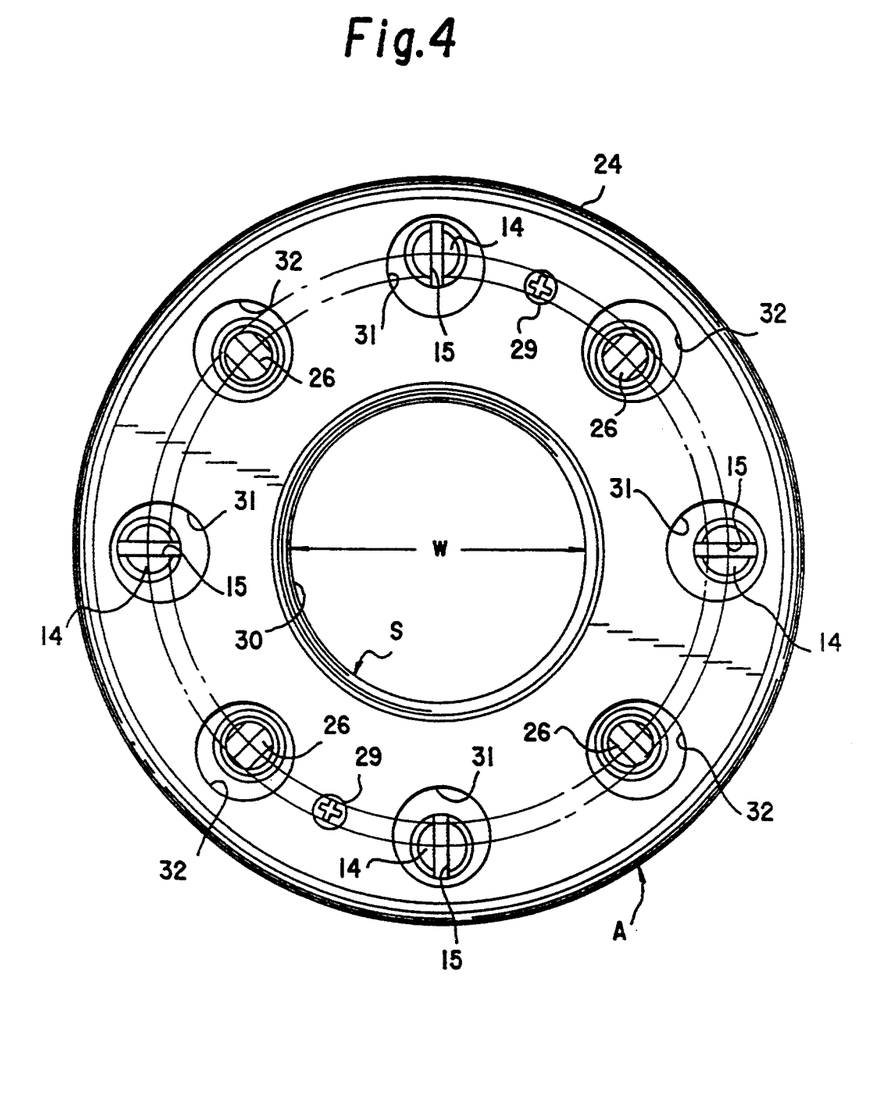
FIG. 4 is a sectional view taken along the line 4—4 in FIG. 3.

The rear surface of said joint flange 24 forms an attaching surface for the hub 18 of the axle and in this case, as shown in FIGS. 3 and 6, it is notched to form a recessed surface 28, in which a separate annular sheet-like offset adjusting shim S is snugly fitted and is fixed in position by a plurality of positioning countersunk screws 29.

In other words, the shim S is integrally clamped in lining accessory relation to the joint flange 24 of the adapter A, so that it is through said shim that the joint flange is attached to the hub 18 of the axle.

Figure 8:
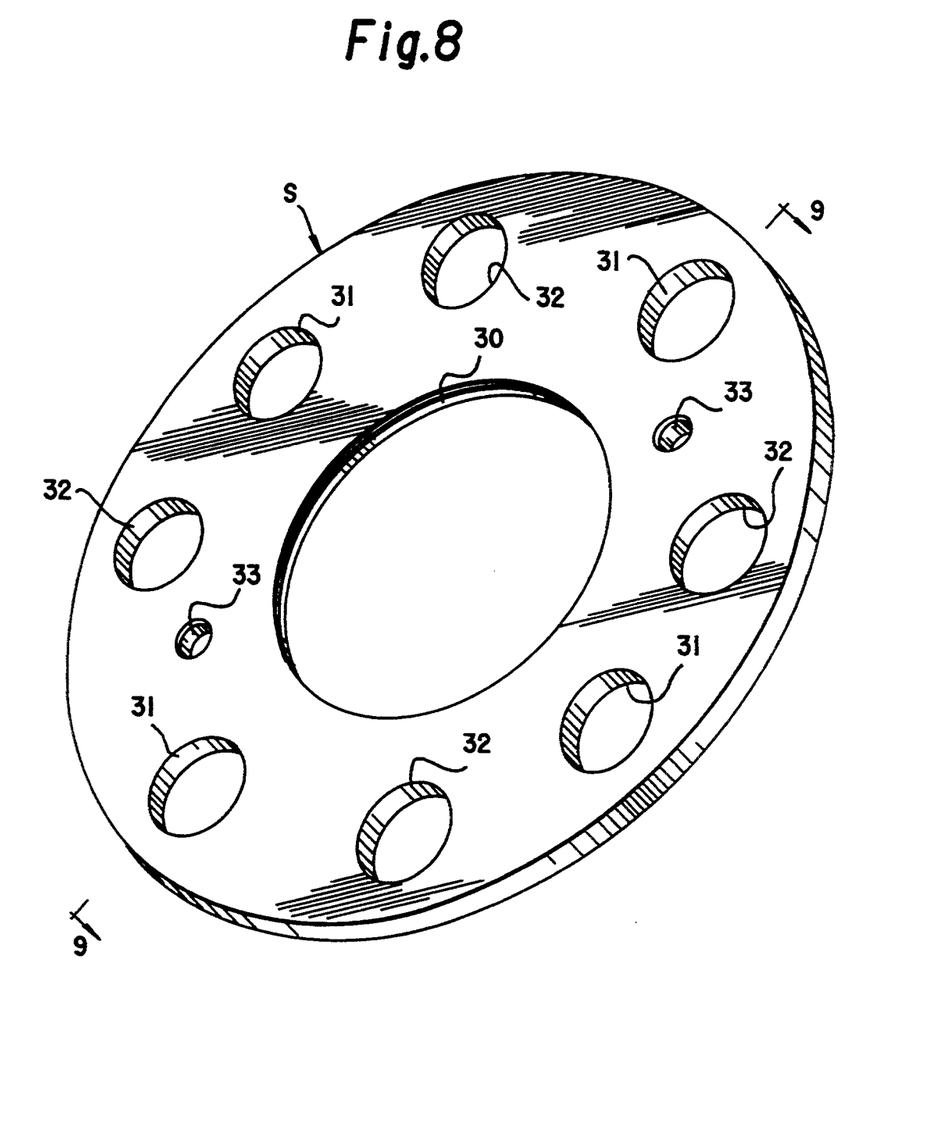
FIG. 8 is a perspective view of an offset adjusting shim.
Figure 9:
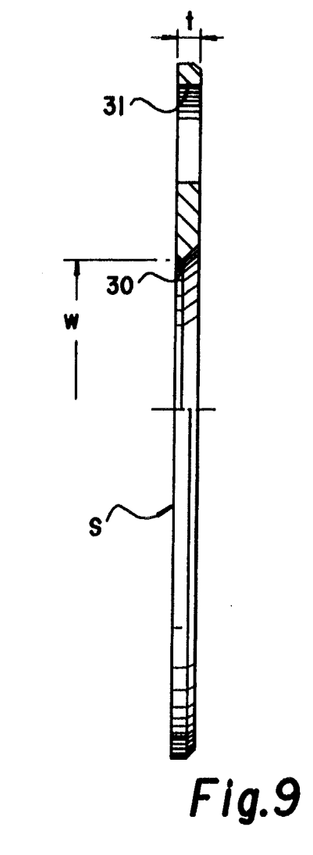
FIG. 9 is a half-sectional view taken along the line 9—9 in FIG. 8.

To this end, as is clear from FIGS. 8 and 9, the shim S is formed at its center with a relatively large, axle receiving centering hole 30 and around the latter with a plurality of torque pin clearing holes 31 aligned with the torque pin receiving holes 25 of said joint flange 24 and also with a plurality of stud bolt clearing holes 32 aligned with said stud bolt receiving holes 27. These torque pin and stud bolt clearing holes 31 and 32 may be made equal in diameter; this is advantageous from the standpoint of productivity. However, the torque pin clearing holes 31 may be omitted depending upon the length of the torque pins 14.

Figure 10:
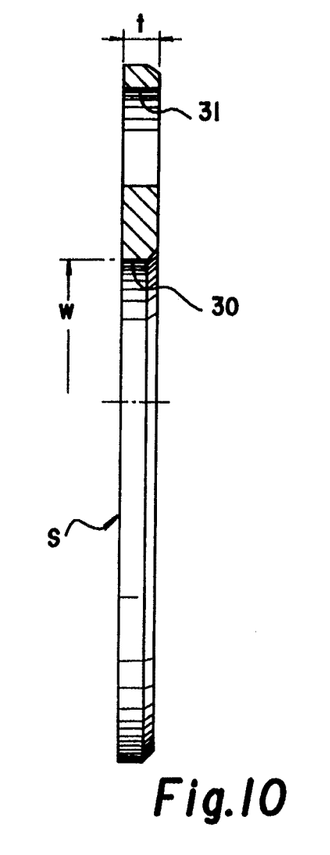
FIG. 10 is a half-sectional view showing another shim to be used interchangeably with the shim of FIG. 9.
Figure 11:
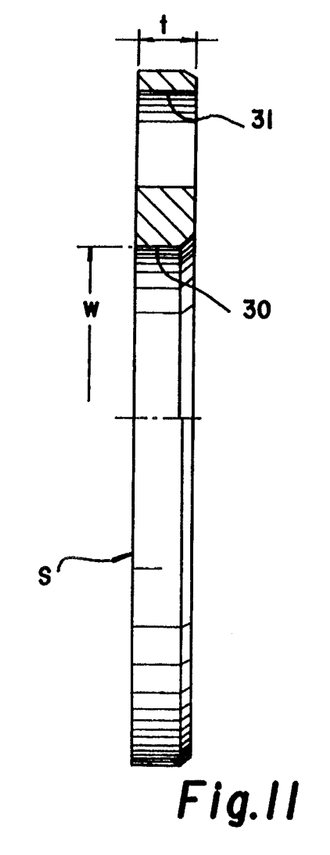
FIG. 11 is a half-sectional view showing another shim to be used interchangeably.

In that case, as is suggested from a comparison between FIGS. 9 and 10, 11, several types of such shims which differ in thickness t alone or in both thickness t and the opening diameter w of the axle receiving centering hole 30 are prepared in advance, so that they are exchangeably and interchangeably used to attach the joint flange 24 of the adapter A to the axle hub 18.

The positioning countersunk screws 29 are used to fix the shim S to the joint flange 24 of the adapter A to ensure that the shim does not come off, and during the fixing operation, they serve to position the torque pin and stud bolt clearing holes 31 and 32 of the shim S in alignment with the torque pin and stud bolt receiving holes 25 and 27 of the joint flange 24, thereby increasing the exchange operation efficiency.

As for the holes 33 for receiving said countersunk screws 29, it goes without saying that they are formed at positions common with said several types of shims S.

According to the arrangement of the shims S described above, in the case where the offset of the wheel differs with automobile makers or automobile types, the offset can be adjusted by an exchange of various types of shims S. Further, several types of shims which differ not only in thickness t but also in the diameter w of the axle receiving centering hole 30 are prepared, the individual diameters of axles which differ with automobile makers or automobile types can be accommodated to establish a firm hub-centric state.

At any rate, after the stud bolt receiving holes 27 of said adapter A and the stud bolt clearing holes 32 of the shim S have been loosely fitted on the stud bolts 26, hub nuts 34 are threadedly engaged with the stud bolts 26 from the front, whereby the adapter A is primarily integrally attached to the wheel disk D and then secondarily the torque pins 14 are force-fitted into the torque pin receiving holes 25 from the front, whereby the wheel disk D is integrally attached to the adapter A.

In that case, each of the hub nuts 34 is clearingly received in the associated recess of the wheel disk D without any possibility of interfering with the boss 10 of the wheel disk D.

Further, the stud bolt receiving holes 27 distributively formed in the joint flange 24 of the adapter A are in conical form snugly fitted to the conical surfaces of the hub nuts 34; thus, automatic centering action is developed when the hub nuts 34 are threadedly engaged with the stud bolts 26. It goes without saying that in consideration of changes in sheet thickness t, hub nuts 34 having required lengths corresponding thereto will be used.

Figure 7:
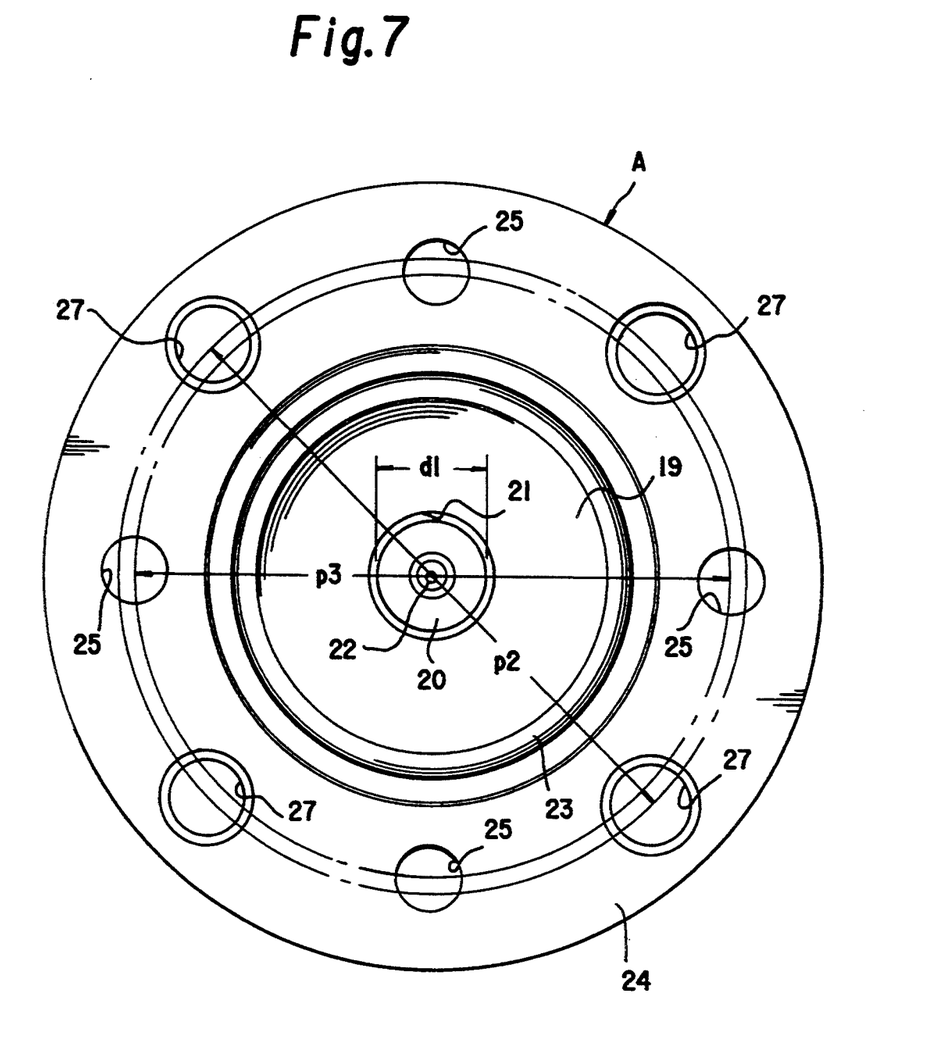
FIG. 7 is a front view showing another adapter to be used interchangeably with the adapter of FIG. 5.

In that case, as suggested from a comparison between FIGS. 5 and 7, it is preferable that an adapters A in which said bolt receiving holes 27 are distributively formed as having a small PCD (pitch circle diameter) p1 and another adapter A in which said stud bolt receiving holes 27 are distributively formed as having a relatively large PCD p2 be prepared in advance and that these adapters be selectively used to attach the wheel disk D to the hub 18 of the axle.

In that case, however, it goes without saying that the pin receiving holes 25 are distributively formed as having the same PCD p3 common with said different adapters.

Further, the stud bolt clearing holes 32 of shims S can be made common with the different adapters by forming them as elongated holes adapted to communicate with all the stud bolt receiving holes 27 distributively formed in the adapters A having different PCDs p1 and p2.

According to the arrangement of the above adapters A, even if the PCDs p1 and p2 of the stud bolts 26 differ with automobile makers or automobile types, there is no need to prepare and store many types of wheels corresponding thereto; it is only necessary to exchange said adapters A so that the wheel disk D can be attached to the hub 18 of the axle without any trouble. This is greatly advantageous for interchangeability.

Figure 1:
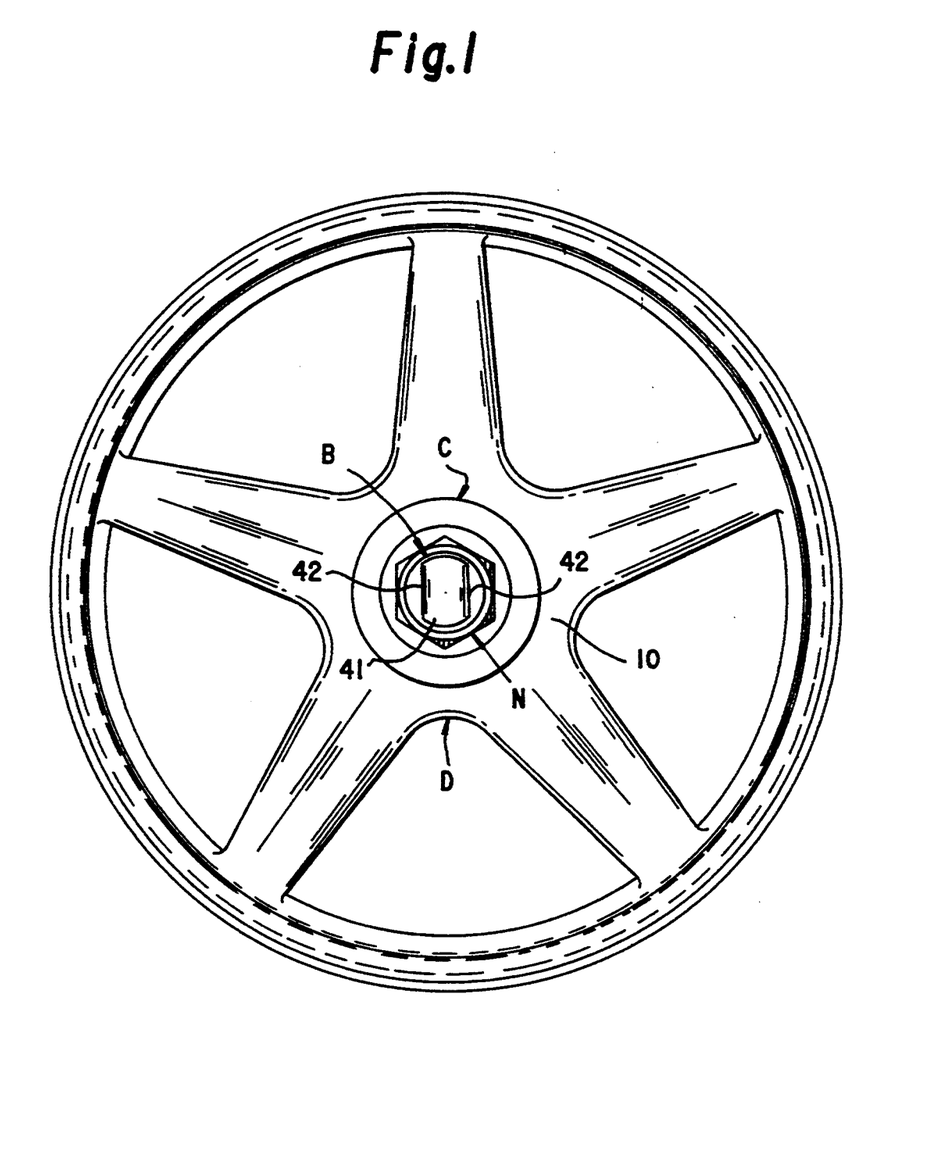
FIG. 1 is a complete schematic front view.
Figure 2:
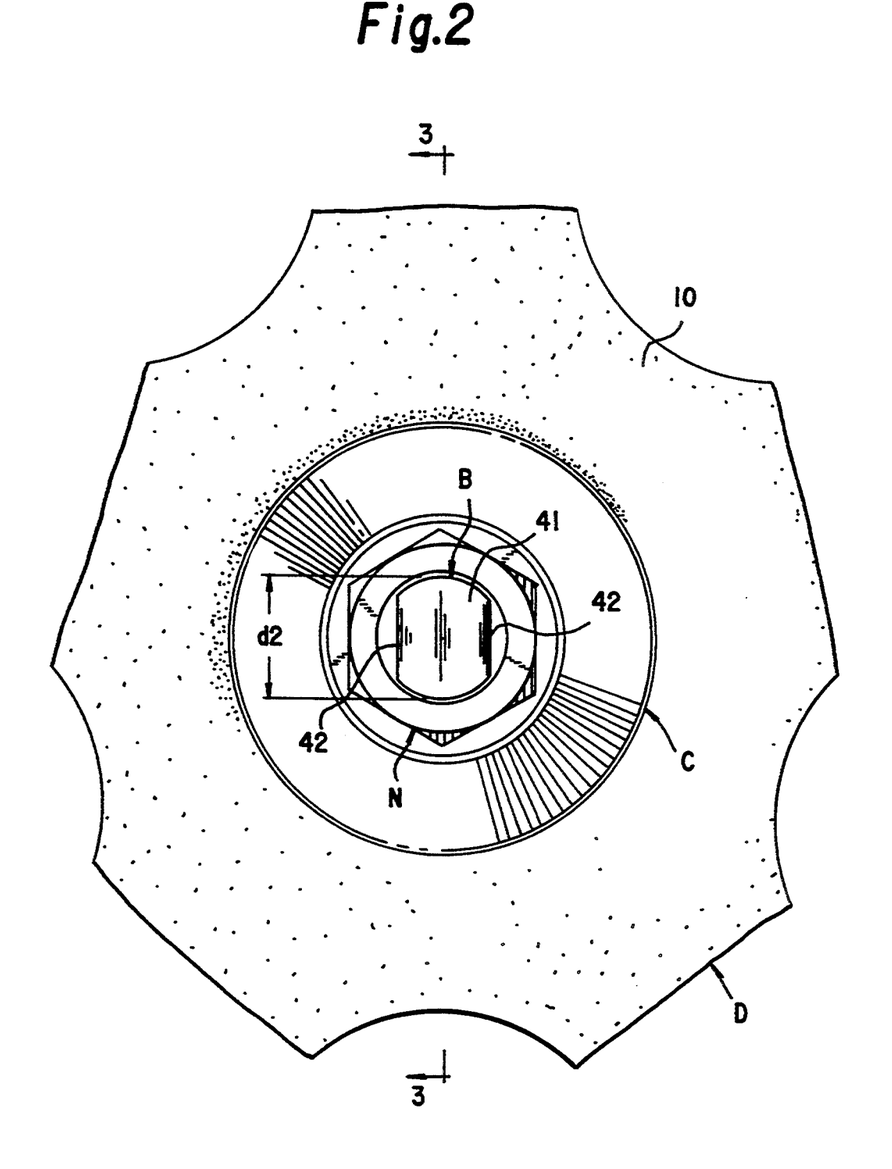
FIG. 2 is a fragmentary enlarged front view.

The character C in FIGS. 1 through 3 denotes a keep collar loosely fitted to the center shaft portion 20 from the front, said keep collar being made of light alloy in a disk form which is large enough to close the shaft hole 11 of the wheel disk D, the rear surface thereof having an insert leg annular portion 35 integrally extending therefrom to be inserted in the support annular portion 23 of the adapter A.

The numeral 36 denotes a conical concave surface recessed in the front central region of the keep collar 35, providing a centering action on the center nut to be later described. The numeral 37 denotes an engaging shoulder surface formed on the peripheral edge of the keep collar C, adapted to engage the boss 10 of the wheel disk D from the front.

The character N denotes a relatively small-diametered center nut threadedly engaged with the male thread 21 of the center shaft portion 20 in the adapter A so as to press against the keep collar C from the front to thereby fix it in position. A flange 39 having a conical convex surface 38 fitted to the conical concave surface 36 of the keep collar C projects from the rear end of said center nut N, while the front end of the center nut N is formed with a keep bolt receiving concave surface 40 to be later described.

The character B denotes keep bolt for the center nut N whose head 41 has a diameter d2 greater than that of the center shaft portion 20 of the adapter A. When it is threadedly engaged with the female thread 22 of the center shaft portion 20, the large-diametered head 41 of the keep bolt B engages the concave surface 40 of the center nut N as it sinks onto said concave surface, thereby locking the center nut N from the front to prevent it from loosening.

In that case, the large-diametered head 41 of the keep bolt B is formed with theft preventing notches 34 for receiving a special turning tool. Therefore, unless the notches are engaged by a special order-made turning tool (not shown), the keep bolt B cannot be turned and hence the center nut N cannot be extracted from the center shaft portion 20 of the adapter A; thus, the theft of the wheel is prevented. It is arranged that commercially available spanners, wrenches or other turning tools cannot be applied to the tool receiving notches 42 of the keep bolt B.

In the illustrated embodiment, the tool receiving notches 42 are in the form of a pair of opposed flat straight surfaces formed by cutting away portions of the circumferential surface of the head 41 of the keep bolt B; however, so long as the above purpose can be attained, for example, an oval groove may be formed in the center of the head 41.

Figure 12:
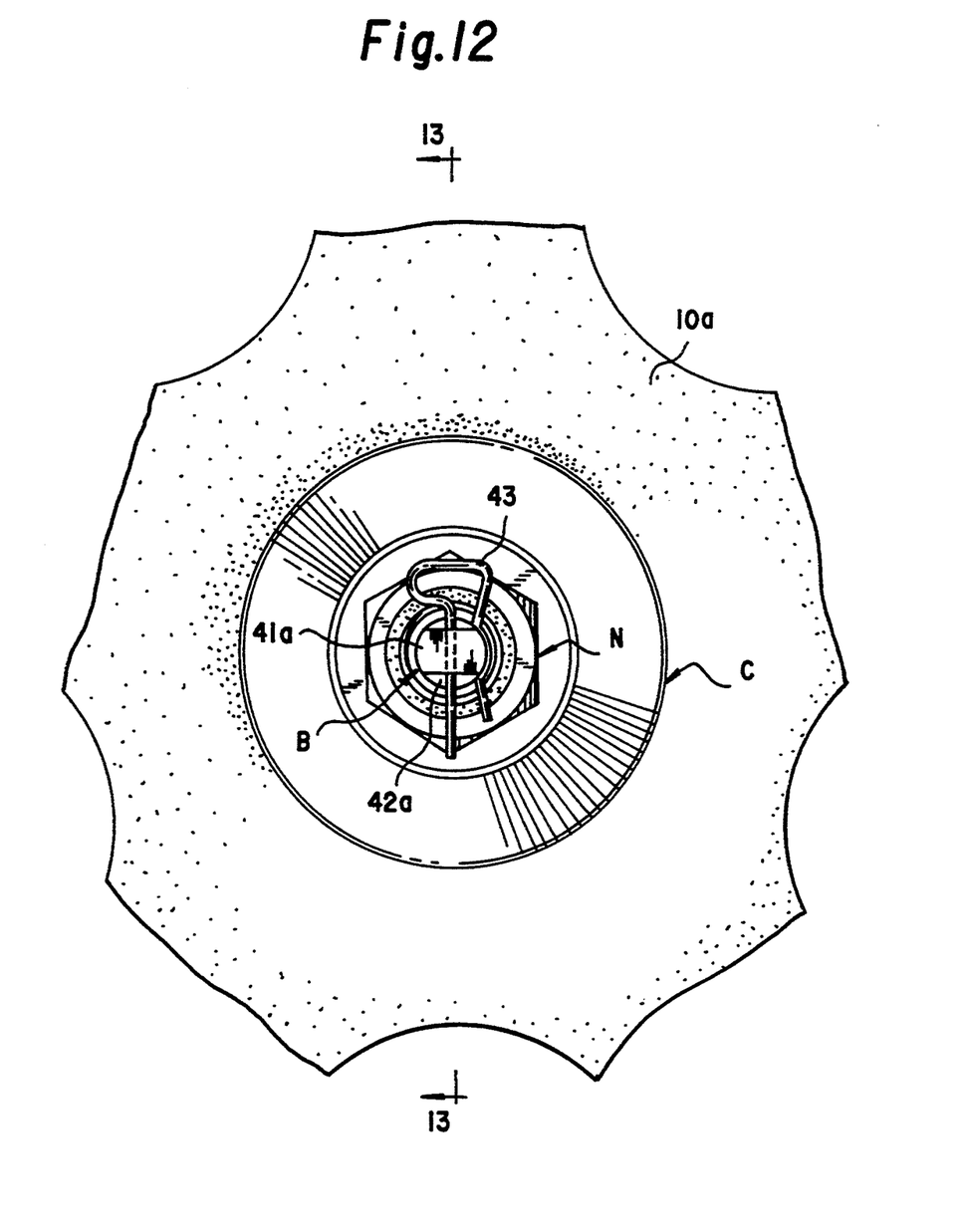
FIG. 12 is a fragmentary enlarged front view showing a modified embodiment of the present invention corresponding to FIG. 2.
Figure 13:
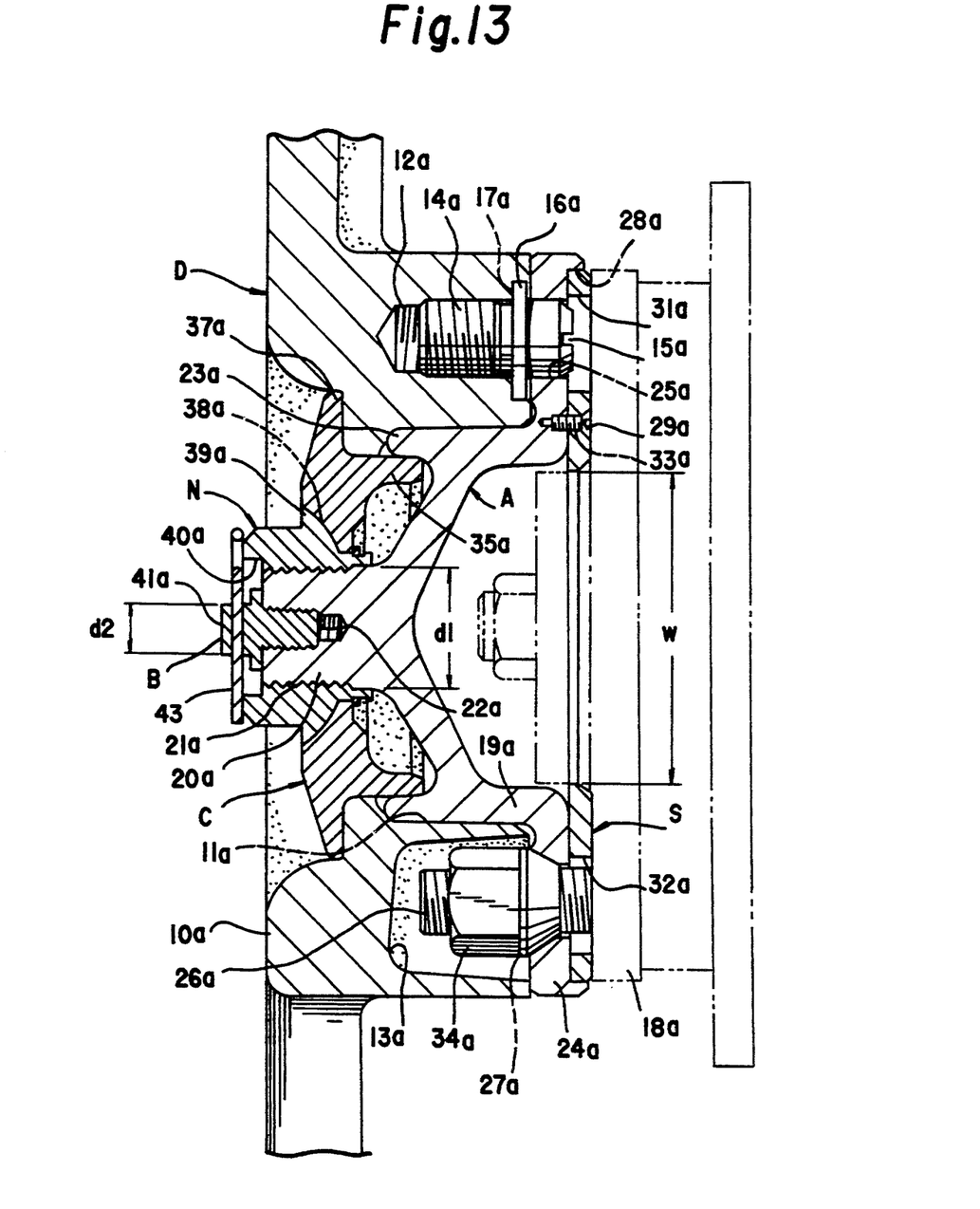
FIG. 13 is a sectional view taken along the line 13—13 in FIG. 12.

However, if and only if the present invention is used for racing cars, as is clear from a modified embodiment shown in FIGS. 12 and 13, in order to make it possible to exchange wheels as soon as possible, a keep bolt B having a head 41a with a smaller diameter than that of the center shaft portion 20a of the adapter A is substituted for said keep bolt B having said large-diametered head 41 and is threadedly engaged with the female thread 22a of the center shaft portion 20a and a beta pin 43 is removably inserted into the small-diametered head 41a of the keep bolt B, thereby holding the center nut N from the front to prevent it from loosening.

By so doing, the center nut N can be extracted from the center shaft portion 20a simply by extracting the beta pin 35 even if the operator does not extract the keep bolt B from the center shaft portion 20a; thus, for racing cars, the wheel can be quickly exchanged.

In addition, the rest of the arrangement in the modified embodiment shown in FIGS. 12 and 13 is the same as in the basic embodiment shown in FIGS. 1 through 11. Therefore, corresponding characters prepared by adding the letter "a" to the reference numerals used in the basic embodiment are entered in FIGS. 12 and 13, and a detailed description thereof is omitted.

The operation of attaching the wheel disk D to the hub 18 of the axle will now be described on the basis of the basic embodiment shown in FIGS. 1 through 11. First, the operator superposes the joint flange 24 of the adapter A having a shim S integrally fitted therein in lining accessory relation on the hub 18 of the axle while inserting the stud bolts 26 set in the hub 18 into the stud bolt clearing holes 32 of the shim S and then into the stud bolt receiving holes 27 of the adapter A, and applies the hub nuts 34 to the stud bolts 26 from the front, thereby fixing the adapter A to the hub 18 of the axle.

Then, with the torque pins 14 force-fitted in the torque pin receiving holes 25 of the adapter A, he fits the boss 10 of the wheel disk D on the barrel 19 of the adapter A from the front and applies the keep collar C to the center shaft portion 20 projecting from the center (top surface) of the barrel 19.

And he threadedly engages the center nut N with the male thread 21 of the center shaft portion 20 to press against the keep collar C by the center nut N. Finally, he threadedly engages the keep bolt B with female thread 22 of the center shaft portion 20 to lock the center nut N from the front by the large-diametered head 33 of the keep bolt B to prevent it from loosening.

Thus, the torque from the hub 18 is smoothly transmitted primarily from the stud bolts 26 and hub nuts 34 to the adapter A and secondarily through the torque pins 14 to the wheel disk D, whereby the wheel is smoothly rotated.

Further, with the wheel thus attached, the male thread 21 and female thread 22 cut in the center shaft portion 20 have their pitches s1 and s2 and spiral directions made respectively different from each other and the center nut N is threadedly engaged with the male thread 21, while the keep bolt B for locking the center nut N is threadedly engaged with the female thread 22, with the result that even if the center nut N is repetitively subjected to hard brakes or other vibrations or shocks during traveling of the automobile, there is no danger of it accidentally loosening; thus, a stable strong wheel attached state can be maintained forever.

Further, in the above-mentioned wheel attached state, the insert leg annular portion 35 extending rearwardly from the keep collar C is stably fitted in the support annular portion 23 extending forwardly from the shoulder region of the conical barrel 19 of the adapter A. Therefore, even if the center shaft portion of the adapter A is decreased in diameter d1 and then repetitively subjected to rotational bending load concentratedly at its proximal end, the stress can be effectively decreased as it is distributed by the support annular portion 23, whereby the neck break accident to the center shaft portion 20 can be avoided. As has been described so far, the present invention provides a center lock device for automobile wheels comprising an adapter A having a conical barrel 19 or 19a and a joint flange 24 or 24a integrally projecting from the proximal end of said conical barrel, said joint flange 24 or 24a being formed with a plurality of stud bolt receiving holes 27 or 27a and a plurality of torque pin receiving holes 25 or 25a, these two types of holes alternating with each other and distributed in radially symmetrical relation, said conical barrel 19 or 19a of said adapter A having a center shaft portion 20 or 20a integrally projecting therefrom, said center shaft portion 20 or 20a being formed with a male thread 21 or 21a for threaded engagement with a center nut N, the arrangement being such that first, in order to attach the adapter A to the hub 18 or 18a of the axle, the stud bolt receiving holes 27 or 27a are loosely fitted on stud bolts 26 or 26a integrally projecting from the hub 18 or 18a of an axle and hub nuts 34 or 34a are threadedly engaged with said stud bolts 26 or 26a from the front, then, in order to attach a wheel disk D to said adapter A, torque pins 14 or 14a integrally projecting forwardly from the boss 10 or 10a of said wheel disk D are force-fitted in the torque pin receiving holes 25 or 25a of said adapter A, and finally a keep collar C adapted to engage the boss 10 or 10a of the wheel disk D is fitted on the center shaft portion 20 or 20a of the adapter A, whereupon the the center nut N is threadedly engaged with the male thread 21 or 21a of the center shaft portion 20 or 20a from the front to press against the keep collar C, thereby fixing the wheel disk D to the adapter A. The center lock device is characterized in that an insert leg annular portion 19 or 19a integrally extends rearwardly from the keep collar C and a support annular portion 23 or 23a integrally extends forwardly from the shoulder region of the conical barrel 19 or 19a of said adapter and are fitted together in such a manner that said insert leg annular portion is supported by said support annular portion. As a result of this arrangement, the problems described in the preamble concerning the known invention can be easily and reliably solved.

More particularly, according to the above arrangement of the present invention, since the support annular portion 23 or 23a integrally extending forwardly from the shoulder region of the conical barrel 19 or 19a forming the top hat or cylinder hat type adapter A and the insert leg annular portion 35 or 35a integrally extending rearwardly from the keep collar C pressed by the center nut N are in the mutually fitted state, the rotational bending load repetitively concentratedly acting on the proximal end of center shaft portion 20 or 20a projecting forwardly from the center of the conical barrel 19 or 19a can be effectively distributed and reduced, thereby preventing the neck break accident to the center shaft portion 20 or 20a.

As a result, even if the center shaft portion 20 or 20a is formed to be small in diameter, the wheel attached state which is durable and stable is obtained. Forming the center shaft portion 20 or 20a to be small in diameter, coupled with the ability to use the small-sized center nut N, makes it possible to form various ventilation patterns for brake heat dissipation on the wheel disk D and allowing the spokes serving as supports for the wheel rims to look as great in length as possible.

Particularly, if the arrangement described in claim 2 is employed, the offset of the wheel which differs with automobile makers or automobile types can be adjusted very easily by simply exchanging the shim S integrally attached in lining accessory relation to the joint flange 24 or 24a of said adapter A. In this case, there is no need to remodel the adapter A or wheel disk D. Thus, the present invention is superior in interchangeability and productivity.

What is claimed is:

1. A center lock device for automobile wheels comprising an adapter (A) having a conical barrel (19, 19a) and a joint flange (24, 24a) integrally projecting from the proximal end of said conical barrel, said joint flange (24, 24a) being formed with a plurality of stud bolt receiving holes(27, 27a) and a plurality of torque pin receiving holes (25, 25a), these two types of holes alternating with each other and distributed in radially symmetrical relation, said conical barrel (19, 19a) of said adapter (A) having a center shaft portion (20, 20a) integrally projecting therefrom, said center shaft portion (20, 20a) being formed with a male thread (21, 21a) for threaded engagement with a center nut (N), the arrangement being such that first, in order to attach said adapter (A) to the hub (18, 18a) of the axle, the stud bolt receiving holes (27, 27a) are loosely fitted on stud bolts (26, 26a) integrally projecting from the hub (18, 18a) of an axle and hub nuts (34, 34a) are threadedly engaged with said stud bolts (26, 26a) from the front, then, in order to attach a wheel disk (D) to said adapter (A), torque pins (14, 14a) integrally projecting forwardly from the boss (10, 10a) of said wheel disk (D) are force-fitted in the torque pin receiving holes (25, 25a) of said adapter (A), and finally a keep collar (C) adapted to engage the boss (10, 10a) of the wheel disk (D) is fitted on the center shaft portion (20, 20a) of the adapter (A), whereupon the the center nut (N) is threadedly engaged with the male thread (21, 21a) of the center shaft portion (20, 20a) from the front to press against the keep collar (C), thereby fixing the wheel disk D to the adapter A, said center lock device being characterized in that an insert leg annular portion (35, 35a) integrally extending rearwardly from the keep collar (C) and a support annular portion (23, 23a) integrally extending forwardly from the shoulder region of the conical barrel (19, 19a) of said adapter are fitted together in such a manner that said insert leg annular portion is supported by said support annular portion.

2. A center lock device for automobile wheels as set forth in claim 1, characterized in that several types of offset adjusting shims (S) which differ in sheet thickness (t) alone or in both sheet thickness (t) and the diameter (w) of the axle receiving centering hole (30, 30a) are prepared so that they can be selectively integrally fitted in lining accessory relation in the joint flange (24, 24a) of the adapter (A), thereby allowing the adapter (A) to contact the hub (18, 18a) of the axle through such shim (S).

* * * * *